May 19, 1970 G. L. HOBROUGH 3,513,257

DUAL IMAGE REGISTRATION SYSTEM WITH ATTENUATION OF HIGH FREQUENCY ERROR SIGNALS CONTROLLED BY LOW FREQUENCY ERROR SIGNALS

Filed Feb. 28, 1968

3 Sheets-Sheet 1

Inventor:
Gilbert L. Hobrough,
by John E. Toupal
Attorney

Inventor:
Gilbert L. Hobrough,
by John E. Toupal
Attorney

Inventor:
Gilbert L. Hobrough,
by John E. Toupal
Attorney

United States Patent Office 3,513,257

Patented May 19, 1970

3,513,257

DUAL IMAGE REGISTRATION SYSTEM WITH ATTENUATION OF HIGH FREQUENCY ERROR SIGNALS CONTROLLED BY LOW FREQUENCY ERROR SIGNALS

Gilbert L. Hobrough, Woburn, Mass., assignor to Itek Corporation, Lexington, Mass., a corporation of Delaware Filed Feb. 28, 1968, Ser. No. 708,931
Int. Cl. H04n *7/18, 9/54;* H01j *39/12*
U.S. Cl. 178—6.5 16 Claims

ABSTRACT OF THE DISCLOSURE

A dual image registration system wherein video signals representing image detail along corresponding scanning paths in a pair of images are correlated to produce multichannel error signals indicative of relative displacement between common image detail in the paths. Before combination of the error signals, a signal transformation circuit attenuates higher frequency error signals in response to reception of given lower frequency error signal values thereby preventing undesirable system control by nonsense signals.

BACKGROUND OF THE INVENTION

This invention relates generally to a control system for combining related electrical signals and is especially suited for use with dual image registration systems.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base can produce for an observer a three-dimensional presentation of the particular terrain imaged on the photograph.

Because of practical flight photography limitations, however, the stereo photographs generally do not possess images of the exactly corresponding surface areas. For this reason a coherent stereo presentation is obtained only if the photographs are properly registered, i.e. so positioned that homologous areas in the two projections are aligned and have the same orientation. The problem of image registration is accentuated by the fact that image detail in the photographs typically is not identical in all respects. Such detail non-uniformity is caused, for example, by photographing a scene from the different camera viewpoints or by variations in altitude, roll and pitch of the photographic aircraft. The resultant distortion between corresponding areas in the photographs prevents common detail registration when the images retained by both photographs are projected onto a common viewing plane.

There have been developed several types of systems which simplify the registration of stereo images. Basically, most such systems derive video signals from image detail in each photograph of a stereogram and then correlate and analyze the video signals to produce error signals indicating various types of distortion. These error signals are used to control image displacement and transformation equipment that produce registration of the projected images. The image transformation can be accomplished, for example, by altering the rasters in the scanning devices utilized, by introducing relative movement between the two photographs, by controlling adjustable optical devices used for projection of the images, etc. Examples of stereo image registration systems are disclosed in U.S. application Ser. No. 394,502 entitled "Photographic Image Registration" and filed Sept. 4, 1964, now U.S. Pat. 3,432,674; and U.S. application Ser. No. 691,536 entitled "Image Correlation System" and filed Dec. 18, 1967, both assigned to the assignee of this invention.

A substantial improvement in image registration is obtained by utilization of a unique correlation method disclosed in the above noted U.S. application Ser. No. 394,502, now U.S. Pat. 3,432,674. According to that method the video spectrum from the photographs is divided into a plurality of channels which are individually correlated thereby substantially improving the efficiency of correlation. The reason for the improvement is that each of the various channels senses image detail of a different scale. For example, low frequency channels sense relatively large scale image detail while higher frequency channels sense smaller scale image detail features. Therefore, the higher frequency channels have a greater sensitivity to detail misregistration than do the lower frequency channels. Accordingly, the overall sensitivity of the system is improved by increasing the contribution of the high frequency channels. This is accomplished by appropriate weighting of the individual channels prior to their combination and use as image transformation control signals.

However, the use of separate error signal channels introduces a new system problem. The transfer characteristics of typical system correlators are such that the error signal values produced thereby are proportional to the degree of relative image displacement for values thereof up to a given maximum but for greater displacements the correlator's output signals become ambiguous and dependent upon the nature of the video signals. These maximum detectable displacement values also are dependent upon frequency with the more sensitive higher frequency channels possessing lower maximum displacement detection capabilities. Therefore, when relative image detail displacements are relatively large the high frequency channels tend to yield nonsense signals and only the low frequency channels develop useful error signals. Under these conditions a fortuitous combination of nonsense signals from the high frequency channels can override the useful signals produced by the low frequency correlators causing a system malfunction called "progressive collapse." There, the overriding nonsense signals produce relative image transformations of a type unrelated to that required for correction of the existing misregistration thereby increasing the relative image detail displacement and driving even the lower frequency correlators beyond their range of effective operation. This process can continue until a complete breakdown of correlation occurs and the system must be completely readjusted by an operator before normal functioning can continue.

The object of this invention therefore is to provide a highly sensitive, multi-channel image registration system that alleviates problems associated with the frequency dependent, non-uniform displacement detection capabilities of the correlation channels.

CHARACTERIZATION OF THE INVENTION

The invention is characterized by the provision of an image registration system that produces separate video signals representing image detail along corresponding paths in a pair of compared images and includes correlation circuits connected to receive the video signals and adapted to produce multi-channel error signals indicative of misregistration between common image detail along the corresponding paths, input terminals each receiving a different one of the error signals and connected by a plurality of signal lines to a combining circuit that combines the error signals received thereby, signal transformation circuits adapted to alter characteristics of the error signals received by certain input terminals in response to the reception of given error signal characteristics on the other input terminals, and image transformation equipment controlled by the output of the combining circuit and adapted to eliminate image detail misregistration between the compared images. The signal transformation circuits improve the effectiveness of the registration system by permitting selective alteration and combination of the different error signals.

A feature of the invention is the provision of an image registration system of the above type wherein the signal transformation circuits attenuate the error signals of higher frequency channels in response to the reception of given error signal values on lower frequency channels. By attenuating more sensitive high frequency error signals in response to the certain degrees of image detail displacement indicated by the given lower frequency error signal values, the possibility of undesirable system response to nonsense signals is reduced.

Another feature of this invention is the provision of an image registration system of the above featured type wherein the signal transformation circuits respond to given signal value outputs on each channel to attenuate the error signals on all channels of higher frequency. With this arrangement, the existence of a particular minimum degree of image detail displacement indicated by the given signal value on one channel attenuates the signals on all of the system's more sensitive higher frequency channels thereby preventing system response to nonsense signals.

Another feature of the invention is the provision of an image registration system of the above featured type wherein the signal transformation circuits comprise transistors adapted to gate the high frequency error signals in response to the presence of given lower frequency error signal values. Transistorized gating is an extremely effective method of attenuating the unwanted signals.

These and other objects and features of the present invention will become more apparent upon a perusal of the following specification take nin conjunction with the accompanying drawings wherein.

Figure 1:
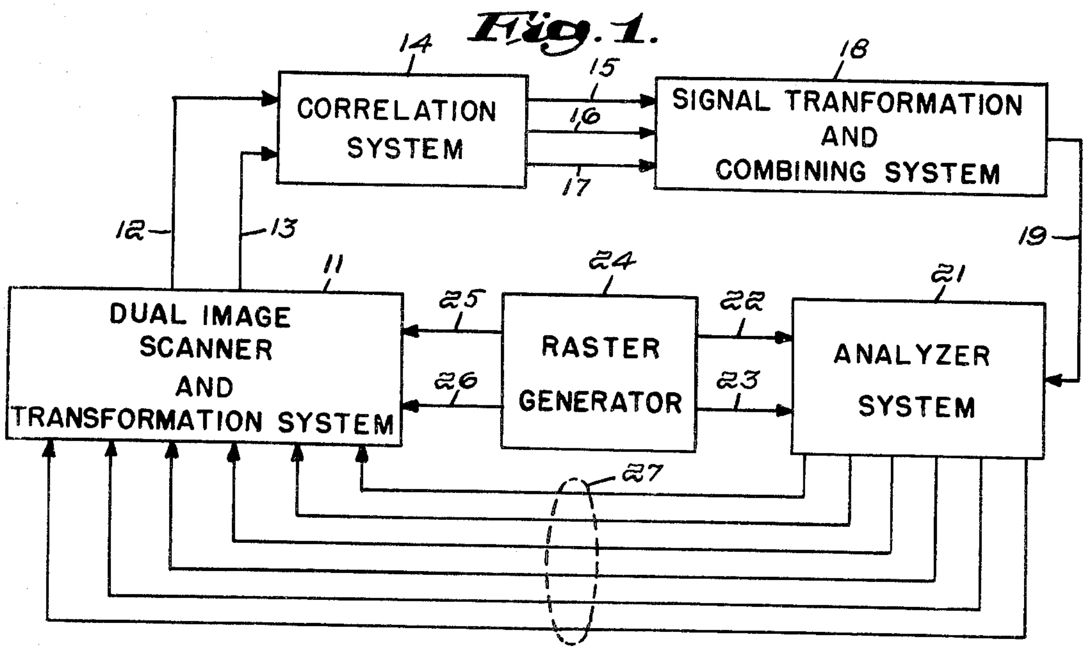
FIG. 1 is a schematic block diagram of a preferred registration system embodiment of the invention.

Referring now to FIG. 1 there is shown the dual image scanner and transformation system 11 which is adapted to simultaneously scan corresponding paths in a pair of stereo photographs and provide on lines 12 and 13 video signals representing the image detail along those paths. The video signals on lines 12 and 13 are applied to the correlation system 14 that divides the video spectrum into channels and provides on lines 15, 16 and 17 composite error signals indicating relative displacement between the common image detail along the simultaneously scanned paths. These composite error signals are combined in the signal transformation and combining system 18 producing on signal line 19 a combined error output signal that is applied to the analysis system 21. Also applied to the analysis system 21 on lines 22 and 23 are reference signals received from the raster generator 24 that produces on lines 25 and 26 deflection voltages for the scanning devices used in the scanner system 11. Analysis in system 21 of the combined error signal on line 19 with respect to the reference signals on lines 22 and 23 produces error signals on lines 27 representing various types of relative distortion existing between the projected images of the photographs being scanned in the scanner system 11. These signals are applied to the scanner and transformation system 11 and used to eliminate the image distortion which they represent. The details of the image scanner and transformation system 11 and the analysis system 21, which do not per se comprise a part of the present invention, are conventional and can be for example, of the type disclosed in the above noted U.S. applications.

Figure 2:
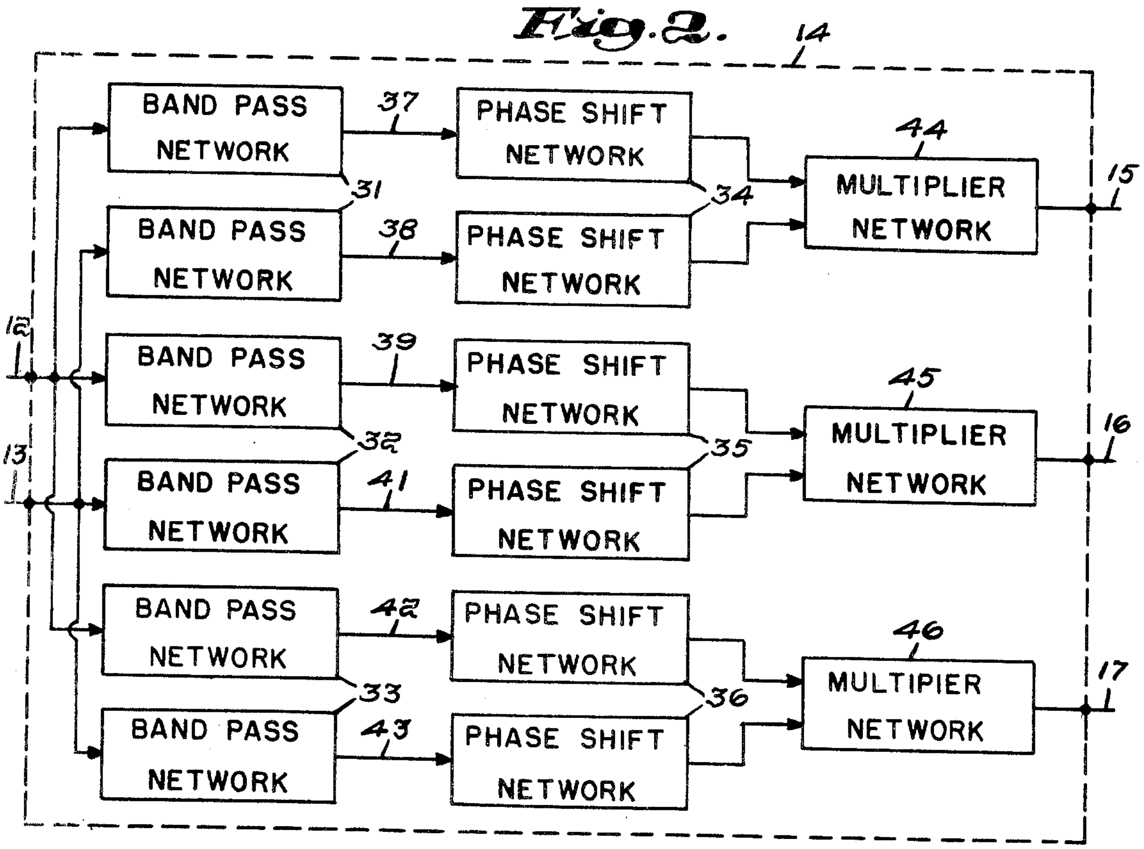
FIG. 2 is a schematic block diagram of the correlation system shown in FIG. 1.

Referring now to FIG. 2, the correlation system 14 includes three pairs of bandpass networks 31, 32 and 33. Both networks in each pair are tuned to accept the same frequency band and the three pairs of networks divide the video spectrum embodied in the video signals on lines 12 and 13 into channels. In a typical example, the network pair 31 accepts a frequency band centered on approximately 150 kilocycles and extending from a lower limit of about 50 kilocycles to an upper limit of about 250 kilocycles, the network pair 32 accepts a frequency band centered approximately on 625 kilocycles and having a lower limit of about 250 kilocycles and an upper limit of about 1 megacycle, and the network pair 33 accepts a frequency band centered on approximately 1.75 megacycles with a lower limit of about 1 megacycle and an upper limit of about 2.5 megacycles. As shown, the video signal on line 12 is applied to one of the networks in each pair and the video signal on line 13 is applied to the other network in each pair.

Also included in the correlation system 14 are the three pairs of phase shift networks 34, 35 and 36. The networks in each pair are adapted to produce a quadrature phase shift between the signals received thereby at the center frequency of the associated bandpass networks. Thus, the network pair 34 produces a relative quadrature phase shift between the signals received from the bandpass network 31 on signal lines 37 and 38, the phase shift networks 35 produce a relative quadrature phase shift between the signals received from the band pass networks 32 on the signal lines 39 and 41, and the phase shift networks 36 produce a relative quadrature phase shift between the signals received from the band pass networks 33 on the signal lines 42 and 43.

The final elements in the correlation system 14 are the three identical multiplier networks 44, 45 and 46. Each of the multipliers 44–46 receives the phase shifted output signals from a different one of the phase shift network pairs 34–36. The multipliers 44, 45 and 46 effect proportional multiplication of the signals received thereby and produce, respectively, the composite error signals on output lines 15, 16 and 17. Circuit details of the multipliers 44–46 are conventional and can be, for example, of the type described in Electrical and Electronic series Fundamental of Television Engineering, 1955, McGraw-Hill Book Co., Glassford, at p. 503, "The Double Balanaced Modulator as a Multiplying Circuit".

Figure 3:
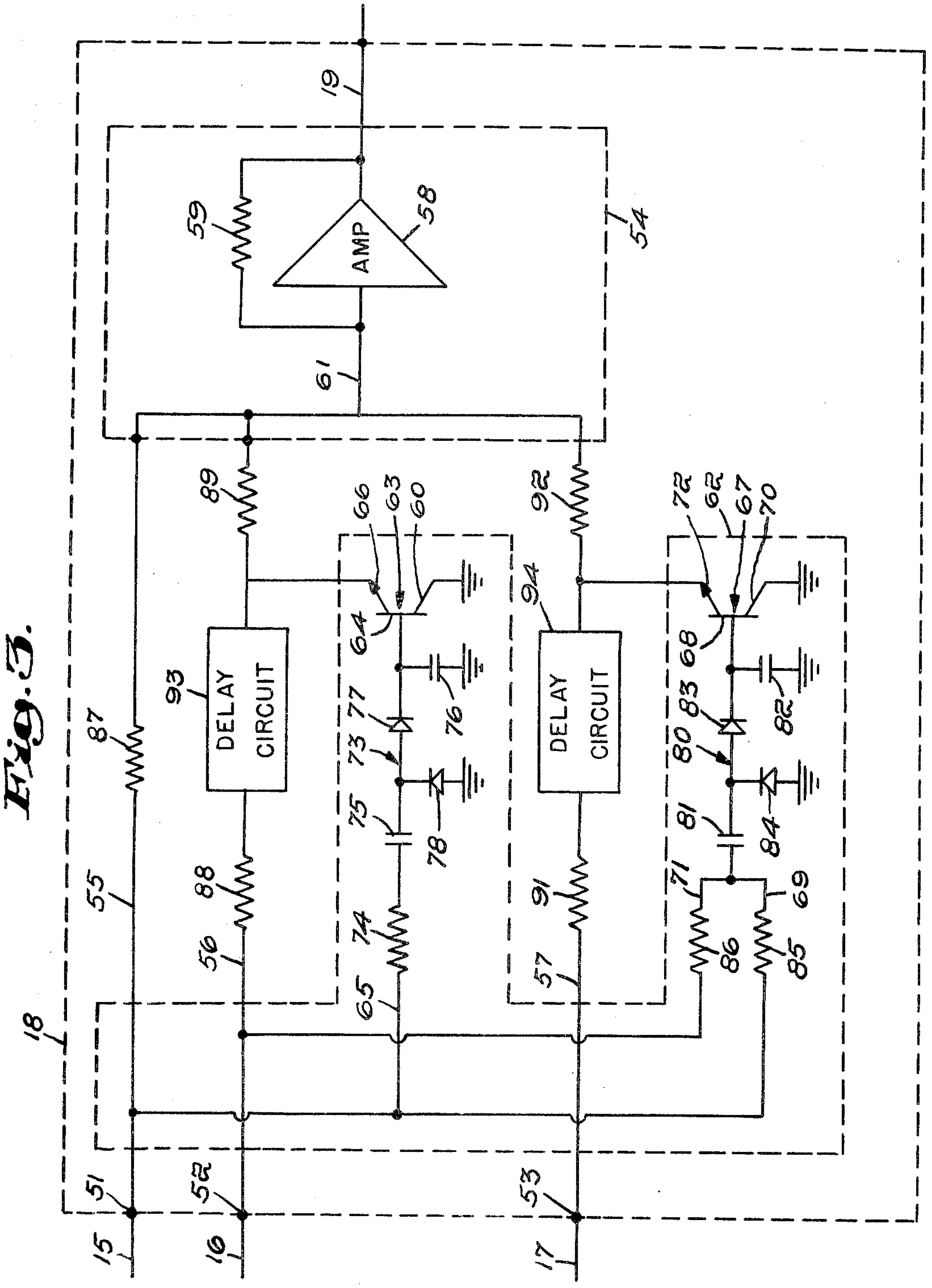
FIG. 3 is a schematic circuit diagram of the signal transformation system shown in FIG. 1.

Referring now to FIG. 3 there is shown in greater detail the signal transformation and combining system 18 shown in FIG. 1. Receiving the composite error signals on lines 15, 16 and 17 are the input terminals 51, 52 and 53 which are connected, respectively, to the combining circuit 54 by the signal lines 55, 56 and 57. The combining circuit 54 includes the operational amplifier 58 and feedback resistor 59 connected by line 61 to signal lines 55–57 and adapted to sum the signals received thereon producing the combined error signal on output 19.

Connected to the signal lines 55–57 between the input terminals 51–53 and the combining circuit 54 is the signal transformation circuit 62. Included in the transformation circuit 62 is the npn transistor 63 having a base electrode 64 connected to the signal line 55 by line 65, an emitter 66 connected to the signal line 56 and a grounded collector electrode 60. Another npn transistor 67 has a base electrode 68 connected by line 69 to the signal line 55 and by line 71 to the signal line 56, an emitter electrode 72 connected to the signal line 57 and a grounded collector electrode 70. Connected in line 65 are the adjustment resistor 74 and the conventional half-wave, voltage doubling rectifier circuit 73 comprising the capacitors 75 and 76 and the diodes 77 and 78. A similar rectifier circuit 80 including capacitors 81 and 82 and diodes 83 and 84 is connected between the base electrode 68 and the connecting lines 69 and 71 which include, respectively, the adjusting resistors 85 and 86.

Additional elements of the signal combining system 18 are the weighting resistor 87 in signal line 55, the weighting resistors 88 and 89 in signal line 56, the weighting resistors 91 and 92 in signal line 57, the delay network 93 in signal line 56 and the delay network 94 in signal line 57. The resistors 87–92 provide a preselected weighted attenuation of the composite error signals received on terminals 51–53 before their summation in the combining circuit 54. The delay networks 93 and 94 are adapted to bring the signals on lines 55–57 into proper time relationship by compensating for unequal delays occurring in the correlation circuit 14.

During operation of the invention, the scanner system 11 produces on lines 12 and 13 video signals representing image detail along corresponding paths in the scanned images retained by a pair of stereo photographs. These signals are divided into channels and correlated in the correlation circuit 14 producing a low frequency error signal on line 15, a mid-frequency error signal on line 16 and a high frequency error signal on line 17. As described in the above noted U.S. patent applications, the use of particular scanning patterns in the scanner system 11 will result in correlator output signals on lines 15–17 having frequencies that are multiples of the line scanning frequency produced in the system 11 by the raster generator 24. Furthermore, for reasons well known in the field of dual image registration, the signals on lines 15–17 will be indicative of both the magnitude and sense of relative displacement between common image detail along the image paths scanned provided that certain maximum displacement values are not exceeded. For image detail displacements beyond the maximum values, the output signals on lines 15–17 become ambiguous. These displacement limits are dependent upon the frequency band being correlated with higher frequency channels being more sensitive to detail displacement than lower frequency channels. Thus, the high frequency signal on line 17 provides a more sensitive indication of relative image detail displacement between the compared images than do the lower frequency signals on lines 15 and 16 but also possesses a lower maximum displacement detection capability than do those signals. Because of this frequency dependent sensitivity, the overall sensitivity of the system can be increased by suitably weighting the composite error signals on lines 15–17 before their summation on line 19. Weighting is accomplished by suitable selection of values for the resistors 87–92 in the combining system 18 such that the low frequency signal received on input terminal 51 is more attenuated than the mid-frequency signal received on input terminal 52 which in turn is more attenuated than the high frequency signal received on input terminal 53.

Although the above described weighting of the different error signal channels improves overall sensitivity of the system, it also introduces some undesirable consequences. As noted above, the lower frequency channels provide useful error signals for greater magnitudes of image detail displacement than do the higher frequency channels. Thus, for example, for relative image detail displacements within the detectable range of the low frequency channel on line 15 but beyond that of the higher frequency channels on lines 16 and 17, the signal applied to input terminal 51 will be a useful signal while those applied to input terminals 52 and 53 will be ambiguous or nonsense signals. Obviously, the summation of the nonsense signals with the useful signal is undesirable and, in the case of extensive high frequency weighting, can cause even the system malfunction known as "progressive collapse." Such collapse occurs when heavily weighted nonsense signals of one sense override useful signals of an opposite sense thereby effecting transformation of the compared images in a relative direction opposite to that required for registration. Accordingly, the relative image detail displacements, rather than being diminished, are increased beyond the capability limits of even the lower frequency correlators thereby inducing a complete breakdown of the registration process.

In the present invention, the undesirable use of nonsense signals is prevented by the signal transformation circuit 62 in the following manner. The low frequency error signal received on input terminal 51 is applied through the resistor 74 to the rectifier circuit 73. Application of the rectified signal to the base electrode 64 causes the gating transistor 63 to conduct heavily between its emitter electrode 66 and grounded collector electrode 60. Thus, the reception of a particular valued error signal on input terminal 51 causes the gating transistor 63 to produce a low impedance shunting path between the resistors 88 and 89 and thereby attenuate greatly the error signal received by the input terminal 52. The value of the resistor 74 is preferably selected so that the shunting of signal line 56 will occur in response to reception by input terminal 51 of error signal values representing degrees of relative image detail displacement beyond the detection capability of the correlator circuits producing the mid-frequency error signal applied to input terminal 52.

Also receiving through resistor 85 the low frequency error signal applied to input terminal 51 is the rectifier 80 which applies a positive voltage to the base electrode 68 of the gating transistor 67. This produces heavy conduction between the emitter electrode 72 and collector electrode 71 thereby creating a shunting path to the signal line 57 and attenuating greatly the high frequency error signal arriving on input terminal 53. The value of the resistor 85 preferably is selected such that shunting of line 57 occurs for the same low frequency signal values that produce shunting of the mid-frequency line 56.

Additional control of the transistor 67 is provided by the mid-frequency signal which is received on input terminal 52 and applied to the rectifier circuit 80 via the resistor 86. Preferably, the value of the resistor 86 is selected so as to produce gating of the transistor 67 upon reception at terminal 52 of a mid-frequency error signal value representing degrees of image detail displacement beyond the detection capability of the high frequency correlators associated with input terminal 53.

Thus, the reception on terminal 51 of low frequency error signals corresponding to image detail displacements beyond the detection capability of the mid-frequency error channel disables both signal lines 56 and 57 so as to prevent application of the nonsense signals thereon to the combining circuit 54. Accordingly, the output on signal line 19 comprises only the useful error signal received by the input terminal 51. Next, assuming the existence of relative image detail displacements detectable by the mid-frequency channel but beyond the capability of the high frequency channel, the value of the low frequency error signal received by input terminal 51 will be insufficient to gate transistor 63 but the mid-frequency signal on terminal 52 will be large enough to gate transistor 67. Therefore, only high frequency line 57 will be disabled and the output of the combining circuit 54 on output line 19 will comprise the summed value of the useful signals on lines 55 and 56. Finally, assuming a reduction in relative image detail displacement to a size within the detection capability of the high frequency channel, the signal values received by both low and mid-frequency input terminals 51 and 52 will be insufficient to gate the transistor 67. Therefore, the useful signals received by all three input terminals 51–53 will be transmitted to the combining circuit 54 for summation therein. Thus, since only useful signals are combined by the combining system 18 and applied for analysis to the analyzer system 21, the problems associated with nonsense error signal outputs are eliminated.

Figure 4:
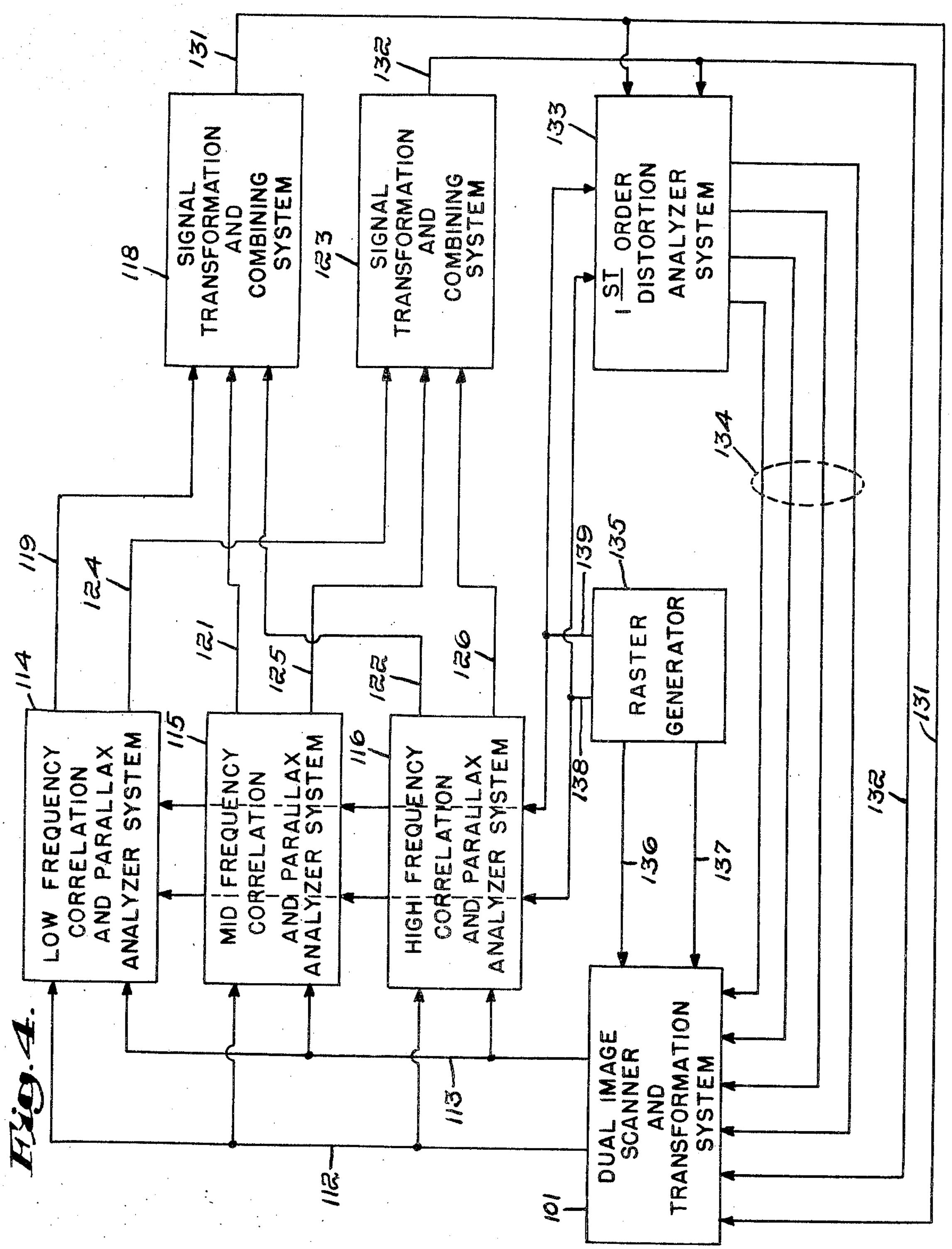
FIG. 4 is a schematic block diagram of another registration embodiment of the invention.

FIG. 4 illustrates another embodiment of the invention having the dual image scanner and transformation system 101 of the same type utilized in the embodiment of FIG. 1. The video signals on the scanner system's output lines 112 and 113 are applied to each of the three correlation and parallax analyzer systems 114, 115 and 116. Received by the signal transformation and combining system 118 on signal lines 119, 121 and 122, respectively, are the *x* parallax signals from the parallax analyzer systems 114, 115 and 116. Another signal transformation and combining system 123 receives on signal lines 124, 125 and 126, respectively, the *y* parallax signals from the parallax analyzer systems 114, 115 and 116.

The combined *x* parallax signal from combining system 118 and the combined *y* parallax signal from combining system 123 are fed on lines 131 and 132, respectively, to both the first order distortion analyzer system 133 and the parallax correcting transformation equipment in the scanner and transformation system 101. Also received by the transformation system 101 from the distortion analyzer system 133 on lines 134 are error signals representing the various types of first order distortion. The raster generator 135 produces, on lines 136 and 137, *x* and *y* deflection voltages which are applied to the scanning devices in the scanner system 101. Also produced by the raster generator 135 on lines 138 and 139 are *x* and *y* reference signals which are applied to each of the correlation systems 114, 115 and 116 and to the distortion analyzer system 133.

Again, the details of the scanning and image transformation system 101, the correlation and parallax analyzer systems 114–116, the distortion analyzer system 133 and the raster generator 135 are conventional and do not comprise, per se, a portion of the present invention. Systems of this type suitable for use in the embodiment of FIG. 4 are disclosed in the above noted U.S. application Ser. No. 394,502, now U.S. Pat. 3,432,674.

During operation of this embodiment each of the correlation systems 114, 115 and 116 accept a different frequency band portion of the video signals on lines 112 and 113 and analyzes the accepted signal channels to produce *x* and *y* parallax signals. Thus, the low frequency correlation system 114 provides a low frequency *x* parallax signal on line 119 and a low frequency *y* parallax signal on line 124, the mid-frequency correlation system 115 provides a mid-frequency *x* parallax signal on line 121 and a mid-frequency *y* parallax signal on line 125, and the high frequency correlation system 116 provides a high frequency *x* parallax signal on line 122 and a high frequency *y* parallax signal on line 126.

All three *x* parallax signals on lines 119, 121 and 122 are applied to the combining system 118 which is identical to and functions in the same manner as the combining system 18 shown in FIG. 3. Similarly, all three *y* parallax signals on lines 124, 125 and 126 are applied to the combining system 123 which also is identical to and functions in the same manner as combining circuit 18 shown in FIG. 3. Therefore, it will be obvious that the transformation and combining system 118 eliminates nonsense signals by selectively disabling either the high or mid-frequency *x* parallax signal channels and provides on line 131 a combination of only the useful *x* parallax signals. Similarly, the transformation and combining system 123 eliminates *y* parallax nonsense signals in the high and mid-frequency channels providing on output line 132 the summation of only useful *y* parallax signals.

The embodiment of FIG. 4 functions in the same basic manner as does the embodiment of FIG. 1 to eliminate problems associated with the production of unwanted nonsense signals. In addition, it provides an operational advantage not present in the FIG. 1 embodiment. Because the initial composite error signals are analyzed into *x* and *y* parallax signals before combination in the combining systems 118 and 123, the system can utilize useful *x* parallax signals in a given frequency band even though the *y* parallax signal in that same band has been disabled. This would occur if the sensed magnitude of *y* parallax were greater than the maximum detectable by a given channel and the simultaneously sensed *x* parallax were of a lesser magnitude within the operating range of that channel. Obviously, inversion of the assumed relative *x* and *y* parallax values would result in production of useful *y* parallax signals on a given channel while the corresponding *x* parallax channel were disabled. It will be appreciated that this technique could be extended by also analyzing the *x* and *y* parallax signals into multi-channel first or higher order distortion signals before combination in an appropriately large number of combining systems of the type shown in FIG. 3.

Obviously, many modifications and variations of the present invention are possible in light of the above teachings. For example, although uniquely suited for use with dual image registration systems, it will be appreciated shown in FIG. 3 can be utilized desirably in other applications requiring interdependent controlled combination of a plurality of useful signals. Also, the three input terminal circuit illustrated is merely exemplary and obviously can be modified for use with systems employing two, four or more signal channels. It is, therefore, to be understood that within the scope of the appended claims the invention can be practiced otherwise than as specifically described.

What is claimed is:

1. A system for producing registration of images having relatively homologous detail content and comprising signal generating means for producing video signals representing image detail along corresponding paths in a pair of images, correlation circuit means connected to receive the video signals and adapted to produce a plurality of error signals each indicating misregistration between common image detail along said corresponding paths, each of said error signals derived from a different frequency band portion of the video spectrums embodied in said video signals, a plurality of input terminals each connected to receive one of said error signals, a plurality of signal lines connecting said input terminals to a combining circuit means adapted to combine the error signals received thereby, signal transformation circuit means connected between said input terminals and said combining circuit means, said signal transformation circuit means adapted to alter a characteristic of the error signal received by one of said input terminals in response to the reception of a given error signal characteristic on another of said input terminals, and image transformation means responsive to the output of said combining circuit means.

2. A system according to claim 1 wherein said signal transformation circuit means is adapted to alter characteristics of the error signals received on a plurality of said input terminals in response to the reception of said given error signal characteristic on said another input terminal.

3. A system according to claim 2 wherein said signal transformation circuit means is adapted to alter a characteristic of the error signal received on said one input terminal in response to the reception of given error signal characteristics on any of a plurality of said input terminals.

4. A system according to claim 1 wherein said combining means is adapted to sum the error signals received thereby and said signal transformation circuit means is adapted to attenuate the error signal received on said one input terminal in response to the reception of a given error signal value on said another input terminal.

5. A system according to claim 4 wherein said signal transformation circuit means comprises gating means adapted to gate the error signal received on said one input terminal in response to the reception of said given error signal value on said another input terminal.

6. A system according to claim 4 wherein said signal transformation circuit means is adapted to attenuate the error signals received on a plurality of said input terminals in response to the reception of said given error signal value on said another input terminal.

7. A system according to claim 6 wherein said signal transformation circuit means is adapted to attenuate the error signal received on said one input terminal in response to the reception of given error signal values on any of a plurality of said input terminals.

8. A system according to claim 6 wherein said signal transformation circuit means comprises gating means adapted to gate the error signals received on said plurality of input terminals in response to the reception of said given error signal value on said another input terminal.

9. A system according to claim 1 wherein said combining circuit means is adapted to sum the error signals received thereby and said signal transformation circuit means is adapted to attenuate the error signal received on said one input terminal in response to the reception of a given error signal value on said another input terminal.

10. A system according to claim 9 wherein said signal transformation circuit means comprises gating means adapted to gate the error signal received on said one input terminal in response to the reception of said given error signal value on said another input terminal.

11. A system according to claim 9 wherein said signal transformation circuit means is adapted to attenuate the error signals received on a plurality of said input terminals in response to the reception of said given error signal value on said another input terminal.

12. A system according to claim 11 wherein said signal transformation circuit means is adapted to attenuate the error signal received on said one input terminal in response to the reception of given error signal values on any of a plurality of said input terminals.

13. A system according to claim 11 wherein said signal transformation circuit means comprises gating means adapted to gate the error signals received on said plurality of input terminals in response to the reception of said given error signal value on said another input terminal.

14. A system according to claim 13 including fixed attenuation means connected in each of said signal lines and adapted to produce differing attenuation of the error signals received on each of said input terminals.

15. A system according to claim 4 wherein the error signal received on said one input terminal is derived from a higher frequency band than that from which said given error signal is derived.

16. A system according to claim 6 wherein said error signals received on said plurality of input terminals are derived from higher frequency bands than that from which said given error signal is derived.

References Cited

UNITED STATES PATENTS 3,432,674 3/1969 Hobrough.

ROBERT L. GRIFFIN, Primary Examiner

D. E. STOUT, Assistant Examiner

U.S. Cl. X.R.

178—6.8; 250—220; 356—2